United States Patent [19]

Kimura et al.

[11] Patent Number: 4,970,445
[45] Date of Patent: Nov. 13, 1990

[54] BRUSHLESS MOTOR DRIVE DEVICE

[75] Inventors: Yoshitsugu Kimura, Sabae; Masahiro Yasohara, Amagasaki; Hiromitsu Nakano, Hirakata, all of Japan

[73] Assignee: Matsushita Electric Industrial Co., Ltd., Osaka, Japan

[21] Appl. No.: 391,608

[22] PCT Filed: Sep. 2, 1988

[86] PCT No.: PCT/JP88/00880
§ 371 Date: Jun. 22, 1989
§ 102(e) Date: Jun. 22, 1989

[87] PCT Pub. No.: WO89/02186
PCT Pub. Date: Mar. 9, 1989

[30] Foreign Application Priority Data

Sep. 4, 1987 [JP] Japan .................. 62-222318

[51] Int. Cl.⁵ .............................. H02P 6/02
[52] U.S. Cl. .......................... 318/254; 318/138
[58] Field of Search .............. 318/138, 254, 439

[56] References Cited

U.S. PATENT DOCUMENTS 4,250,435  2/1981  Alley et al. .................. 318/138
4,603,283  7/1986  Oltendorf .................. 318/138 X
4,608,527  8/1986  Glennon et al. ................ 318/685
4,651,068  3/1987  Meshkat-Razavi ............. 318/439 X
4,900,993  2/1990  Yasohara et al. ............. 318/138 X

FOREIGN PATENT DOCUMENTS 49-57313  6/1974  Japan .
61-3193   1/1986  Japan .

Primary Examiner—Bentsu Ro
Attorney, Agent, or Firm—Wenderoth, Lind & Ponack

[57] ABSTRACT

The present invention relates to a drive device for a brushless motor utilizing no position detector for detecting the position of a movable element of the motor.

The drive device comprises a phase controlled loop for controlling an output of a voltage controlled oscillator (40) by supplying an electric power to motor driving coils (1, 2, 3), detecting the difference in phase between the power supply waveforms thereof and a counter-relectromotive force of the motor driving coils during a power supply interrupting period with the use of a phase difference detector (20) and inputting a detected phase difference signal to the voltage controlled oscillator (40), an oscillation frequency initializing means (70) and a driving transistor interrupting circuit (80).

3 Claims, 4 Drawing Sheets

BRUSHLESS MOTOR DRIVE DEVICE

FIELD OF TECHNOLOGY

The present invention relates to a brushless motor drive device which does not make use of a position detector for detecting the position of a movable element of an electric motor.

BACKGROUND ART

As a means trend of improving motor durability and reliability, a brushless motor is being largely employed for various drive motors. In general, the brushless motor requires the use of a position detector for detecting the position of a movable element. However, in order to further reduce the price and the size, a brushless motor which does not require the use of the position detector is necessary. A conventional example of a drive device for such a brushless motor is disclosed in, for example, the Japanese Laid-open Patent Publication No. 52-80415.

Hereinafter, the above described conventional drive device for the brushless motor will be discussed with reference to the drawings.

FIG. 4 is a circuit diagram of the conventional brushless motor drive circuit. In FIG. 4, driving coils 1 to 3 are connected at their one end with each other. The driving coil 1 is connected at the other end to the anode of a diode 4, the cathode of a diode 5 and the respective collectors of driving transistors 10 and 13. The driving coil 2 is connected at the other end to the anode of a diode 6, the cathode of a diode 7 and the respective collectors of driving transistors 11 and 14. The driving coil 3 is connected at the other end to the anode of a diode 8, the cathode of a diode 9 and the respective collectors of driving transistors 12 and 15. The respective cathodes of the diodes 4, 6 and 8 and the respective emitters of the driving transistors 10, 11 and 13 are connected to a positive power supply line, and the respective anodes of the diodes 5, 7 and 9 and the respective emitters of the transistors 13, 14 and 15 are connected to earth. The other ends of the driving coils 1 to 3 are also connected with a filtering circuit 16 which generates an output to a power supply switching circuit 17. An output from the power supply switching circuit 17 is supplied to the respective bases of the driving transistors 10 to 15.

FIG. 5 is a diagram used to explain the operation of FIG. 4, wherein Uo, Vo and Wo represent respective waveforms of electric power signals supplied to the driving coils 1, 2 and 3. The power supply waveforms Uo, Vo and Wo have their high harmonic components removed by the filtering circuit 16 and are respectively converted by the filtering circuit 16 into output signals F1, F2 and F3 which are delayed 90° in phase. It is to be noted that the filtering circuit 16 is a primary filter and is constituted by, for example, a RC passive filter, a primary Miller integrator, etc., the cut-off frequency of which is set to a sufficiently low region as compared with the frequencies of the power supply waveforms of the coils. The output signals F1, F2 and F3 are inputted to the power supply switching circuit 17. The power supply switching circuit 17 is constituted by a logic circuit and is adapted to generate control signals $U_H$, $U_L$, $V_H$, $V_L$, $W_H$ and $W_L$ in response to the output signals F1, F2 and F3, respectively. These control signals $U_H$, $U_L$, $V_H$, $V_L$, $W_H$ and $W_L$ are supplied to the bases of the driving transistors 10 to 15 to cause the latter to perform respective switching operations. At this time, the switching operations are carried out so that a motor driving torque can generate in a constant direction at all times for driving a motor.

In the prior art construction, it is necessary to use the filtering circuit having a cut-off frequency characteristic for each a phase of the driving coils and, accordingly, a number of capacitors of high capacitance is required.

Also, where the inductance of the driving coils is high, the power supply current to be passed through the coils tends to be delayed in time after the driving transistors are switched on and permanent magnetic fields tends of be degaussed by magnetic fields generated by the driving coils. A so-called an armature reaction exists. In such a case, it is well known that, when the driving coils are supplied with an electric power in such timings as shown in FIG. 5, the efficiency tends to be lowered. As a countermeasure, a technique in which the signals F1, F2 and F3 are somewhat advanced in phase to operate the driving transistors so as to compensate for a delay in power supply resulting from the armature reaction is disclosed in the Japanese Laid-open Patent Publication No. 62-80415, however, component parts such as capacitors are further required to accomplish it. Also, the power supply waveform Uo, Vo and Wo tend to be accompanied by spike noises generated when the driving transistors are switched off, a variation in power source voltage, a variation in current attributable to a change in load, and so on and therefore it is often difficult to obtain accurately a power supply switching signal from the power supply waveform Uo, Vo and Wo through the use of the filtering circuit. As a countermeasure, a system has been suggested such as disclosed in the Japanese Patent Publication No. 59-36519.

However, the system wherein the use is made of the filtering circuit for providing the power supply switching signal from the power supply waveform for the driving coils basically has the following problem. In other words, a voltage drop resulting from both of the power supplied during the supply of the electric power to the driving coils and internal impedances of the driving coils, a spike noise occurring immediately after the interruption of the power supply, and so on tend to be superimposed on a fundamental wave (counterelectromotive force) of the power supply waveforms of the driving coils, which constantly vary with a variation in power source voltage and load. Accordingly, where the power supply waveforms of the driving coils are filtered to provide the power supply switching signal, an error tends to occur as a result of the above described component which is superimposed on the fundamental wave (counterelectromotive force) of the power supply waveforms while the latter constantly vary, and it is therefore difficult to accurately supply the electric power to the driving coils.

In order to eliminate the above described conventional problems, various methods have been suggested to obtain the power supply switching signal accurately, all of which are basically such that adjustment is effected in the periphery of the filtering circuit for maintaining at a constant value the difference in phase between the driving coil counterelectromotive force and the power supply switching signal, and the adjustment is extremely cumbersome. Also, other than those necessary for the filtering circuit, a number of additional capacitors are required and, therefore, when the driving circuit is fabricated into an integrated circuit, both of the number of component parts to be connected and the number of connection pins tend to be increased, rendering the price high. Also, a system wherein no filtering circuit is employed and, instead, the use is made of, for example, a microcomputer for digitally providing the power supply switching signal is disclosed in the Japanese Laid-open Patent Publication No. 61-293191, which is too expensive.

As hereinbefore discussed, since the conventional drive device for the brushless motor is so constructed that the filtering circuit is used to process the power supply waveforms of the driving coils to provide the power supply switching signal having a predetermined phase relationship to the position of the movable element, in which the switching signal is utilized to sequentially energize the driving coils, it is not possible to obtain the accurate power supply switching signal because of a voltage drop in the driving coils resulting from the spike noises contained in the power supply waveforms of the driving coils and the electric current supplied, a variation of the superimposed component resulting from the change of the power source voltage and the load, the armature reaction and so on. Also, an increased number of capacitors of high capacitance are required for constructing the filtering circuit and, in particular, when the driving circuit is to be fabricated in an integrated circuit, both of the number of the component parts to be connected and the number of the connection pins tend to be increased, rendering it to be disadvantageous in terms of price.

In view of the foregoing, a system such as disclosed in the Japanese Patent Publication No. 61-3193 is suggested wherein the counterelectromotive force generated in the driving coils is shaped as to its waveform and the use is made of a phase locked loop (PLL) circuit to generate an appropriate phase pulse to permit the driving coils to be sequentially supplied with the electric power to drive the motor. However, in such a system, a voltage drop resulting from the electric current supplied during the supply of the electric power to the driving coils and the internal impedances of the driving coils, the spike noises generated immediately after the interruption of the power supply and so on are superimposed and, therefore, it is extremely difficult to obtain the pulse signal by shaping and arithmetically processing the counterelectromotive force generated in the driving coils.

As hereinbefore discussed, the conventional drive devices for the brushless motor have had the various problems.

Accordingly, the object of the present invention is to provide a drive device for a brushless motor wherein the necessity of the use of a number of capacitors of high capacitance hitherto required in the conventional filtering circuit is eliminated and the sequential supply of an electric power through the driving coils is possible without being adversely affected by any possible effect brought about by spike noises contained in the power supply waveform for the driving coils, a variation in power source voltage, a variation in load and an armature reaction, wherefore a head loss of the driving transistors can be avoided to thereby to avoid any possible destruction of the driving transistors which would occur as a result of an increase of the heat loss.

Also, another object of the present invention is to provide a drive device for the brushless motor wherein the supply of an unnecessary electric power to the motor is avoided to minimize a loss.

DISCLOSURE OF THE INVENTION

The present invention is comprised of a plurality of phases of motor driving coils, a plurality of driving transistors connected with the driving coils, a power supply switching signal generator for sequentially transmitting a power supply switching signal to the driving transistors for driving the drive coils, a voltage controlled oscillator for outputting a signal having an appropriate frequency to the power supply switching signal generator, a phase difference detector for detecting the difference in phase between a counterelectromotive force, generated in the driving coils during the interruption of the supply of an electric power to the driving coils, and the power supply switching signals, a difference amplifier for amplifying an output from the phase difference detector and for inputting it to the voltage controlled oscillator, an oscillation frequency initializing means for initializing the oscillation frequency of the voltage controlled oscillator, and a driving transistor interrupting circuit for disabling the plural driving transistors and for starting the sequential supply of an electric power to the driving transistors at the time the oscillation frequency is initialized.

Accordingly, since it forms a feedback loop, that is, a phase controlled loop (PLL loop) by detecting the difference in phase between the counterelectromotive force, generated in the motor driving coils, and the power supply switching signal for the motor driving coils, controlling both of the frequency and the phase of the power supply switching signal in dependence on the phase difference detected and causing the power supply switching signal to maintain a predetermined phase relationship relative to the position of a movable element, the filtering circuit hitherto used is rendered unnecessary and, therefore, all of various inconveniences resulting from the use of the filtering circuit can be eliminated.

Also, since the difference in phase between the counterelectromotive force generated in the motor driving coils and the power supply switching signal for the motor driving coils is detected during the interruption of the power supply, an accurate detection of the phase difference is possible and the phase controlled loop can be stably operated.

In addition, immediately after the application of a power source voltage Vcc, a constrained condition of the movable element as a result of a certain load during a normal rotation of the motor is detected in terms of the operation of the oscillation frequency initializing means and, by disabling the plural driving transistors, an unnecessary power supply to the motor during the constrained condition of the movable element is avoided and also any possible destruction of the driving transistors as a result of the head loss is avoided.

BEST MODE OF CARRYING OUT THE INVENTION

Hereinafter, a drive device for the brushless motor in one embodiment of the present invention will be described with reference to the drawings.

Figure 1:
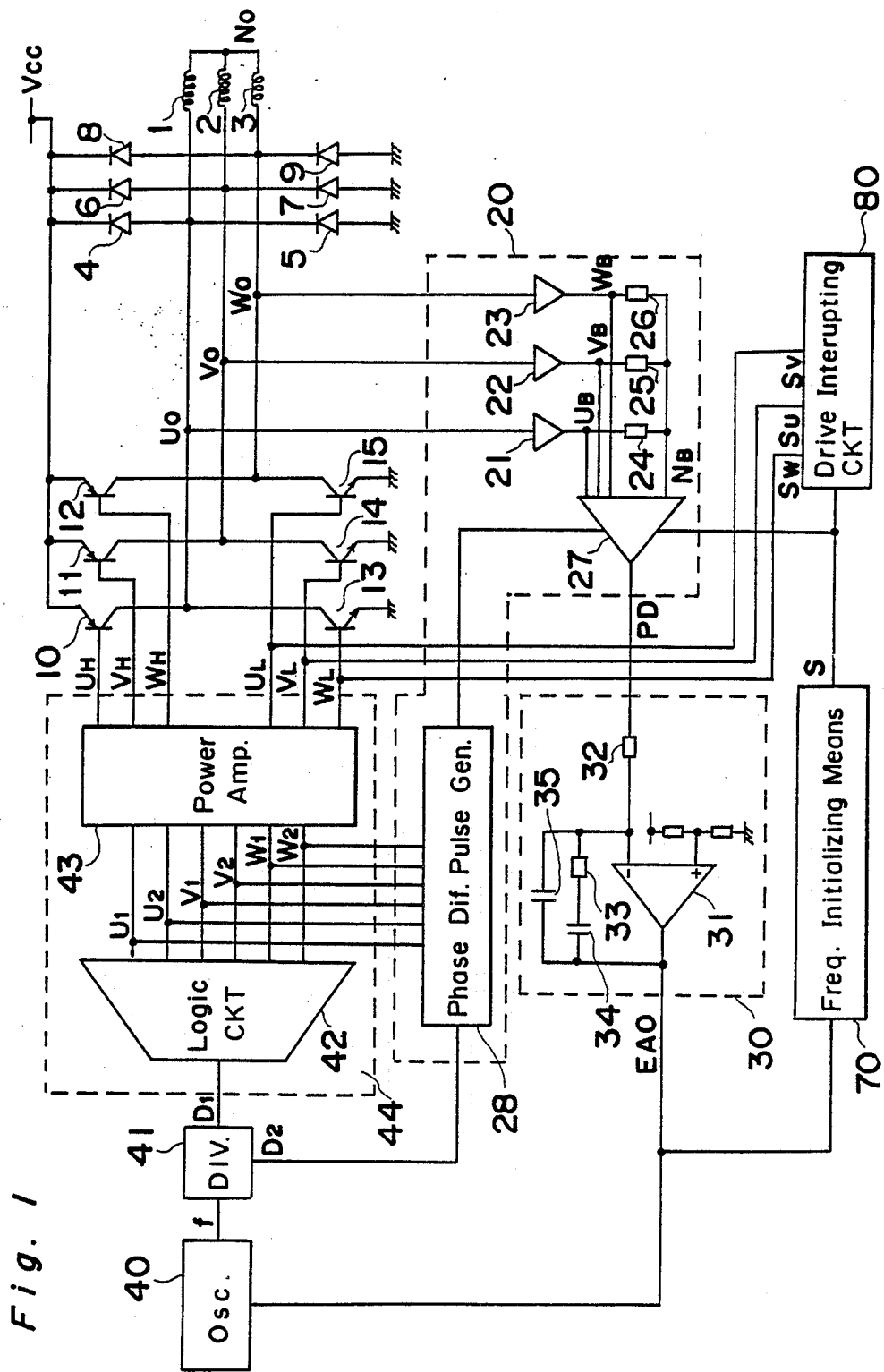
FIG. 1 is a circuit diagram showing a drive device for a brushless motor according to one embodiment of the present invention.

FIG. 1 is a circuit diagram showing a drive device for a brushless motor according to one embodiment of the present invention. In FIG. 1, like reference numerals are employed to denote like parts which are identical in function with those of the conventional drive device for the brushless motor and, therefore, the details thereof will not be described.

In FIG. 1, the respective bases of the driving transistors 10 to 15 are connected with outputs of a power amplifier 43 having inputs connected with respective outputs of a logic circuit 42. The logic circuit 42 and the power amplifier 43 together constitute a power supply switching signal generator 44. The logic circuit 42 has an input connected with an output D1 of a frequency divider 41 having an input connected with an output of a voltage controlled oscillator 40. A phase difference detection pulse generator 28, the frequency divider 41 and the power supply switching signal generator 44 are connected so that another output D2 from the frequency divider 41 and the respective outputs U1, U2, V1, V2, W1 and W2 from the logic circuit 42 can be inputted to the phase difference detection pulse generator 28. The driving coils 1, 2 and 3 are connected at one end with buffer circuits 21, 22 and 23 to which associated signals having power supply waveforms Uo, Vo and Wo are supplied. Respective output sides of the buffer circuits 21, 22 and 23 are connected with a comparator 27 to which respective outputs $U_B$, $V_B$ and $W_B$ from the buffer circuits 21, 22 and 23 are supplied, and are connected together at a common junction $N_B$ through associated resistors 24, 25 and 26, through which junction $N_B$ is connected with the comparator 27. An output PD from the comparator 27 is controlled by an output from the phase difference detection pulse generator 28. It is to be noted that the various component parts 21 to 28 together constitute a phase difference detector 20 and that the output PD forms an output from the phase difference detector 20. An output side (output PD) of the phase difference detector 20 is connected through a resistor 32 with an inverting input terminal of an operational amplifier 31, and the inverting input terminal and an output terminal of the operational amplifier 31 are connected together through a series circuit of resistor 33 and capacitor 34 and a capacitor 35. A non-inverting input terminal of the operational amplifier 31 is applied with a predetermined bias voltage through resistors 36 and 37. It is to be noted that the various component parts 31 to 37 altogether constitute a difference amplifier 30 and an output side of the difference amplifier 30 is connected with an input side of the voltage controlled oscillator 40.

Furthermore, an output EAO of the difference amplifier 30 is applied with an oscillation frequency initializing means, and an output signal S from the oscillation frequency initializing means 70 is inputted to the comparator 27 and the driving transistor interrupting circuit 80. An output side of the driving transistor interrupting circuit is connected so that signals Su, Sv and Sw outputted from the driving transistor interrupting circuit 80 can be inputted to the respective bases of the driving transistors 13, 14 and 15, respectively.

The operation of the drive device for the brushless motor so constructed as hereinabove will be hereinafter described.

In FIG. 1, the output from the voltage controlled oscillator 40 is transmitted to the driving coils 1 to 3 through the frequency divider 41, the power supply switching signal generator 44 and the driving transistors 10 to 15. Accordingly, the output from the voltage controlled oscillator 40 and the power supply waveforms of the driving coils 1 to 3 have a predetermined phase relationship. In other words, by controlling the oscillation frequency and the phase of the voltage controlled oscillator, it is possible to control the difference in phase between a counterelectromotive force of the driving coils and the power supply waveforms of the driving coils. In the event that a deviation occurs in the phase angle between the counterelectromotive force of the driving coils and the power supply waveforms of the driving coils, a phase difference $\psi$ thereof is detected and amplified by the phase difference detector 20 and the difference amplifier 30 and, by providing a phase control loop for controlling the oscillation frequency and the phase of the voltage controlled oscillator 40 so as to render the phase difference $\psi$ to be zero, it is possible to secure a proper power supply condition to the driving coils. Accordingly, it is possible to stably and efficiently generate a motor driving torque at all times and the motor can be driven.

The operation of the phase difference detector 20 will now be described. The driving coil 1 is supplied with signals U1 and U2 (that is, signals $U_H$ and $U_L$), synchronized with D1 and D2 which are frequency divided outputs of the voltage controlled oscillator 40, as a power supply command signal. Accordingly, the period during which both of the signals U1 and U2 are not outputted is a power supply interrupting period and, during this period, the power supply waveform Uo of the driving coil coincides with a counterelectromotive force Ue. The power supply interrupting period is a period starting from the timing at which the signal U1 is rendered to be Low and ending with the timing at which the signal U2 is rendered to be High and corresponds to one clock of the signal D1 or four clocks of the signal D2. Although a similar power supply interrupting period exists even during the period subsequent to the signal U2 being rendered to be Low and prior to the signal U1 being rendered to be High, only the former period is taken into consideration for the sake of brevity. During the power supply interrupting period, comparing a neutral point voltage No of the driving coils with the power supply waveform Uo of the driving coil, when the phase difference $\psi$ between the power supply waveform Uo and the counterelectromotive force Ue of the driving coil is zero, the neutral point voltage No and the power supply waveform Uo coincide at a timing intermediate of the power supply interrupting period, that is, a timing after 2 clocks of the signal D2 subsequent to the signal U1 being rendered to be Low. Also, where Uo is delayed relative to Ue by a phase difference $\psi$, No and Uo coincide before the timing 2 clocks of D2 prior to U1 being rendered to be Low, and, where Uo is advanced relative to Ue by a phase difference $\psi$, No and Uo coincide after the timing 2 clocks of D2 subsequent to U1 rendered to be Low. Accordingly, by comparing Uo and No with each other after 2 clocks of D2 subsequent to U1 being rendered to be Low, one can know the phase relationship between Uo and Ue. Therefore, if as a method of detecting the phase difference ψ arrangement is made to generate a phase difference detection pulse signal S having an appropriate width in reference to the timing 2 clocks of D2 subsequent to U1 being rendered to be Low and to compare No and Uo with each other only at the time the signal S is generated, the comparator output PD having a duty corresponding to the phase difference ψ can be obtained.

While in the foregoing the principle of operation has been made in connection with the detection of the phase difference ψ in which the power supply interrupting period subsequent to U1 rendered to be Low and prior to U2 rendered to be High with respect to the power supply waveform Uo of the driving coil, a similar detection is possible utilizing the other power supply interrupting periods relative to Uo, that is, the period subsequent to U2 rendered to be Low and prior to U1 rendered to be high, and also, with respect to the power supply waveforms Vo and Wo of the other driving coils 2 and 3, and in the illustrated embodiment the phase difference detector output PD is obtained by synthesizing all of them.

Figure 2:
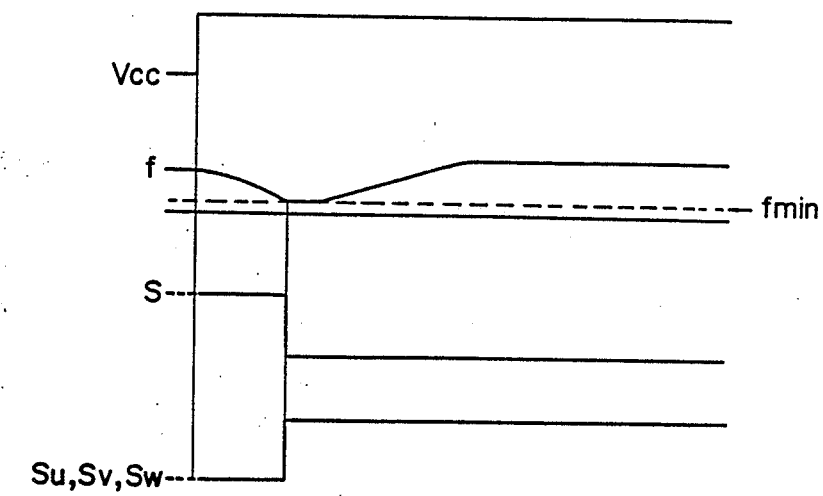
FIGS. 2 and 3 are explanatory diagrams used to explain the principle of operation of FIG. 1.

FIG. 2 is an explanatory diagram used to explain the operation of FIG. 1. Immediately after the application of the power source voltage Vcc, the output EAO of the difference amplifier 30 is generally unstable depending on the initial charge accumulated in the capacitors 34 and 35 and the state of the output PD of the phase difference detector 20. Accordingly, the output oscillation frequency f of the voltage controlled oscillator 40 is also unstable. Assuming that f is oscillated at a very high frequency, the sequential power supply switching of the driving coils 1 to 3 takes place at a high speed and the speed of rotation of a rotating magnetic field is accelerated. On the other hand, since a movable element has an inertia, and if the speed of rotation of the rotating magnetic field is high immediately after the powering on, the number of revolutions of the motor will not follow the rotating magnetic field and will be unable to be started due to a loss of a starting torque. Therefore, in order to avoid the occurrence of this condition, an arrangement has been made in which the output S of the oscillation frequency initializing means 70 will be rendered to be of a High level immediately after the application of Vcc, causing EAO to be lowered to thereby to render the oscillation frequency f to be a low frequency. When the movable element is lowered down to fmin at which it can sufficiently follow the speed of rotation of the rotating magnetic field, the output S of the oscillation frequency initializing means is rendered to be of a Low level.

However, during a period in which the oscillation frequency initializing means 70 is operated, the movable element is generally in a constrained condition and an excessive electric current is flowing across the driving transistor. Therefore, a heat loss of the driving transistors is increased and an unnecessary electric power is supplied to the motor. In view of this, in order to avoid the occurrence of this condition, all of the outputs Su, Sv and Sw of the driving transistor interrupting circuit 80 are rendered to be Low when the output S of the oscillation frequency initializing means 70 is rendered to be of High level, thereby interrupting the supply of an electric power to the bases of the driving transistors 13, 14 and 15 so that the supply of the electric power to the driving coils 1, 2 and 3 can be interrupted. When the output S of the oscillation frequency initializing means 70 is rendered to be of Low level, the operation of the driving transistor interrupting circuit is released to permit the driving transistors to initiate a respective switching operation consequent upon the increase of f to a value higher than fmin and, in correspondence therewith, the rotating magnetic field can be progressively accelerated from the speed at which the movable element can follow, with the motor consequently started.

Also, if the movable element is, for example, momentarily constrained during a condition in which the motor is efficiently driven, both of the oscillation frequency initializing means 70 and the driving transistor interrupting circuit 80 are caused to operate in the same manner as those taking place immediately after the power has been turned on, thereby to initialize f to a low frequency again with the motor consequently started.

Figure 3:
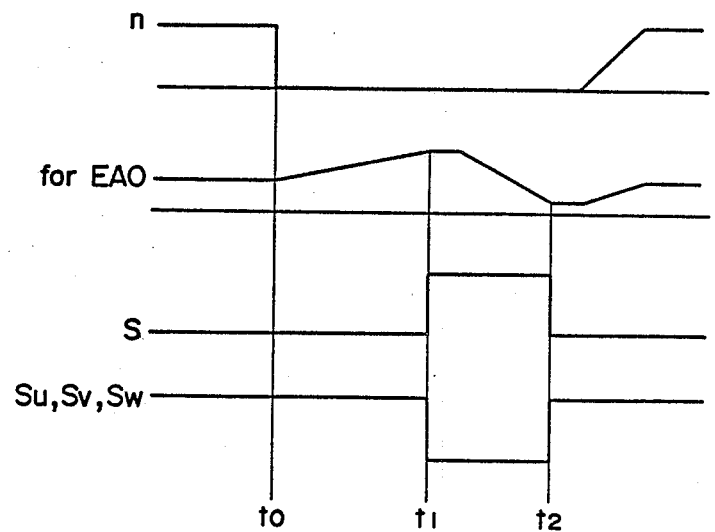
Figure 4:
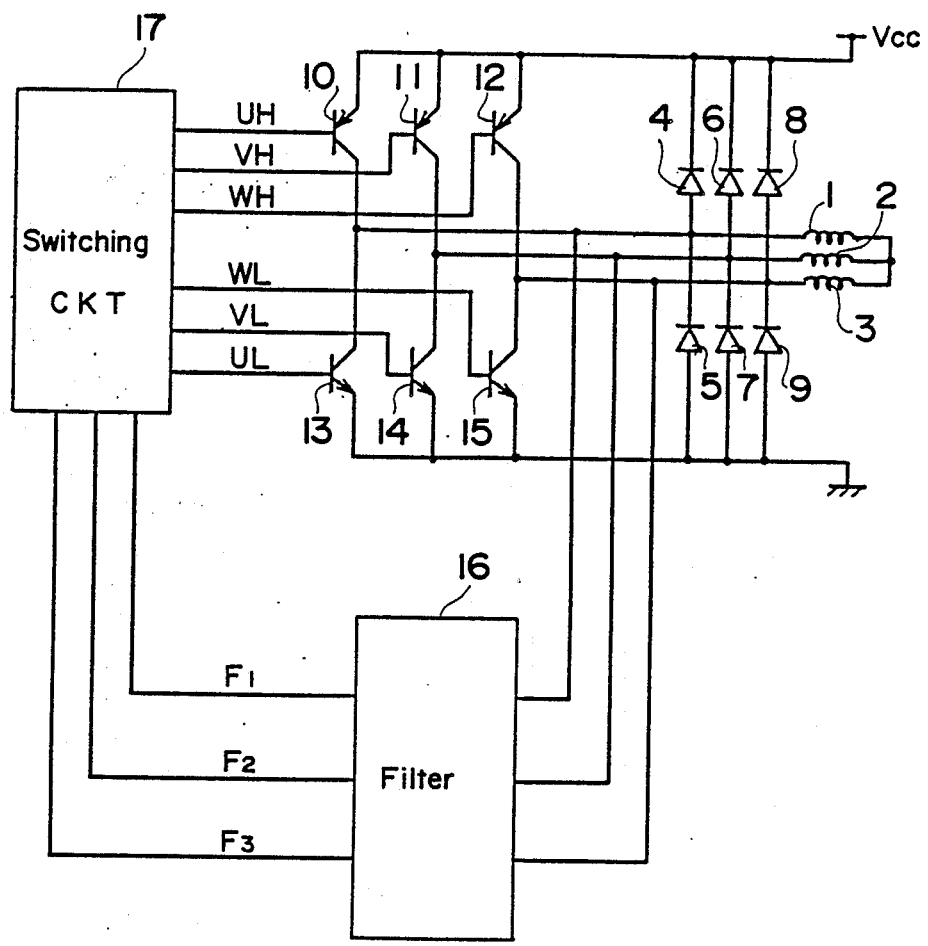
FIG. 4 is a circuit diagram showing the conventional drive device for the brushless motor.
Figure 5:
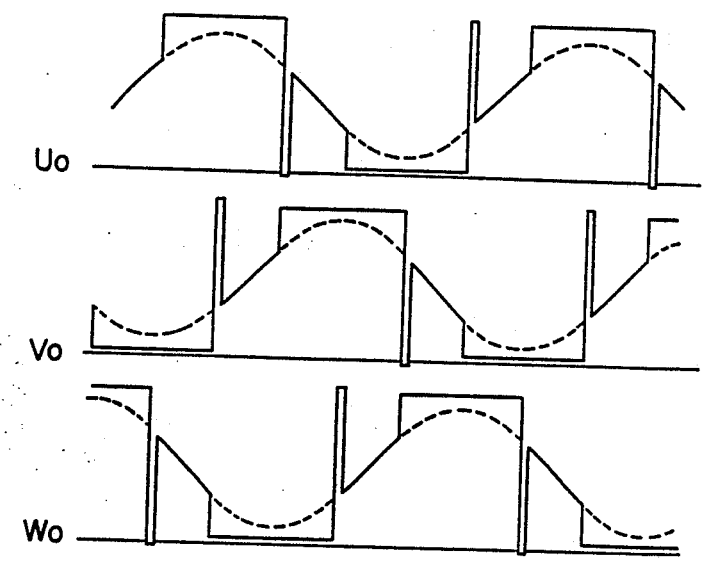
FIG. 5 is an explanatory diagram used to explain the operation of FIG. 4.
Figure 5:
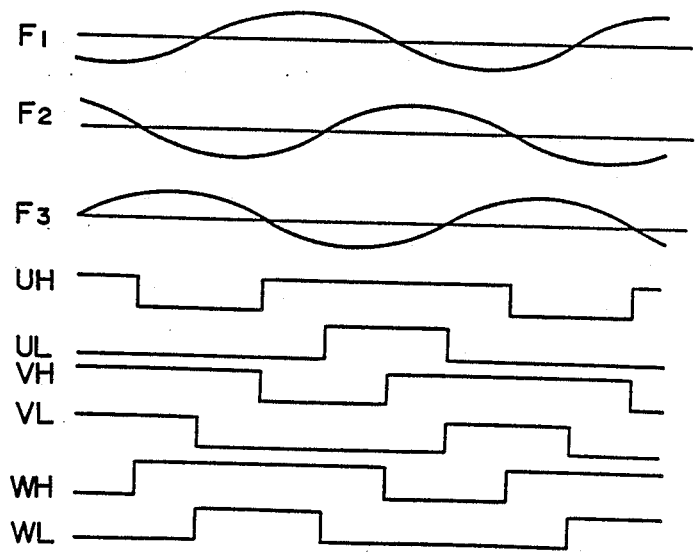

FIG. 3 is an explanatory diagram showing the above described operation.

It shows respective operations of the various component parts when the movable element is constrained at a timing to in FIG. 3 with the number n of revolution of the motor rendered to be zero. According to FIG. 3, it is shown that an abnormality in the oscillation frequency is detected at the timing t1, the initialization of the oscillation frequency is completed at a timing t2, the driving transistor interrupting circuit is operated during a period from the timing t1 to the timing t2, and the motor is restarted after the timing t2.

INDUSTRIAL APPLICABILITY

As hereinbefore fully described, the drive device comprises a phase controlled loop for controlling an output of a voltage controlled oscillator (40) by supplying an electric power to motor driving coils (1, 2, 3), detecting the difference in phase between the power supply waveforms thereof and a counterelectromotive force of the motor driving coils during a power supply interrupting period with the use of a phase difference detector (20) and inputting a detected phase difference signal to the voltage controlled oscillator (40), an oscillation frequency initializing means (70) and a driving transistor interrupting circuit (80). Therefore, the present invention does not require the use of the filtering circuit hitherto required thereby making it possible to considerably reduce the use of the capacitors of high capacitance and is effective to avoid any possible reduction in efficiency resulting from a voltage drop attributable to the spike noises contained in the power supply waveform of the driving coil, the electric current supplied and the driving coil impedance, a variation in power source voltage and load and the armature reaction and, at the same time, to avoid the increase of the heat loss of the driving transistors and the supply of the unnecessary electric power to the motor during the condition in which the movable element is momentarily constrained immediately after the application of the power source voltage Vcc or during the motor being driven.

Also, the provision of the drive device for the brushless motor capable of exhibiting an extremely excellent characteristic in that any possible destruction resulting from the increased heat loss of the driving transistors during the constraining of the movable element for a prolonged length of time can be realized at low cost.

We claim:

1. A drive device for a brushless motor which comprises a plurality of phases of motor driving coils, a plurality of driving transistors connected with the driving coils, a power supply switching signal generator for sequentially transmitting a power supply switching signal to the driving transistors for driving the driving coils, a voltage controlled oscillator for outputting a signal having an appropriate frequency to the power supply switching signal generator, a phase difference detector for detecting the difference in phase between a counterelectromotive force, generated in the driving coils during the interruption of the supply of an electric power to the driving coils, and the power supply switching signals, a difference amplifier for amplifying an output from the phase difference detector and for inputting it to the voltage controlled oscillator, an oscillation frequency initializing means for initializing the oscillation frequency of the voltage controlled oscillator, and a driving transistor interrupting circuit for disabling the plural driving transistors and for starting the sequential supply of an electric power to the driving transistors at the time the oscillation frequency is initialized.

2. The drive device for the brushless motor as defined in claim 1, wherein the phase difference detector comprises a phase difference detection pulse generator operable to generate a pulse signal during an appropriate period in which the supply of an electric power to the motor driving coils is interrupted, and a comparator for comparing a terminal voltage of the driving coils with a reference voltage in dependence on an output pulse signal of the phase difference detection pulse generator.

3. The drive device for the brushless motor as defined in claim 1, wherein the phase difference detector comprises a phase difference detection pulse generator operable to generate a pulse signal during an appropriate period in which the supply of an electric power to the motor driving coils is interrupted, a buffer circuit provided at terminals of the driving coils, and a comparator for comparing an output voltage from the buffer circuits with a reference voltage in dependence on an output pulse signal of the phase difference detection pulse generator.

* * * * *